United States Patent Office 3,382,267
Patented May 7, 1968

---

3,382,267
FERROCENE CYCLIC THIOETHERS
John T. Suh, Mequon, Wis., assignor to Colgate-Palmolive Company, New York, N.Y., a corporation of Delaware
No Drawing. Filed Oct. 7, 1965, Ser. No. 493,878
16 Claims. (Cl. 260—439)

This application relates to novel ferrocene compounds. More particularly, it relates to novel ferrocene cyclic thioethers, processes of preparing them, pharmaceutical compositions containing the thioethers, and therapeutic uses for such compositions. Ferrocene is the commonly accepted name for dicyclopentadienyliron or biscyclopentadienyliron.

The compounds of the present invention may be represented as follows:

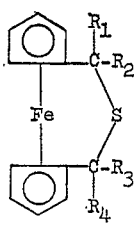

wherein $R_1$, $R_2$, $R_3$ and $R_4$ are selected from the group consisting of hydrogen, lower alkyl such as methyl, ethyl, isopropyl, butyl and hexyl, an aryl such as phenyl, or a nuclear-substituted phenyl such as halogen substituted phenyl, an aralkyl such as benzyl, phenethyl, phenylisopropyl, diphenylmethyl, a cycloalkyl, particularly a cycloalkyl having from 3 to 7 carbon atoms such as cyclopropyl, cyclopentyl, cyclohexyl and a cycloalkyl-loweralkyl such as cyclohexylmethyl and cyclopentylethyl.

The novel compounds ma be prepared by treating a ferrocene diol with a concentrated liquid lower aliphatic acid which contains an acid catalyst in the presence of hydrogen sulfide. The process proceeds quickly even at room temperature and produces cyclic thioethers almost quantitatively. The thioethers, thus obtained, are of high purity and usually do not require additional recrystallization or purification.

The process of the present invention may be represented as follows:

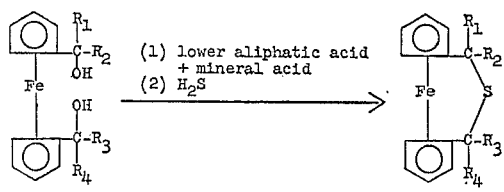

in which $R_1$, $R_2$, $R_3$ and $R_4$ have the previously assigned value.

In the preferred practice of the present invention, the lower aliphatic acid is glacial acetic acid to which has been added a catalytic amount of sulfuric acid. Hydrogen sulfide is continuously passed through the acid mixture, and diol in added portionwise with stirring. The mixture is then stirred and refluxed while continuing to pass hydrogen sulfide through it until the reaction is substantially complete.

In addition to glacial acetic acid, other lower aliphatic acids such as formic and propionic acids may be employed. Aqueous solutions of the acids may be employed, but the concentration of the acid should be about 70% to 100% by volume. The amount of acid required is that amount which will completely dissolve the diol employed as a starting material. However, a slight excess is generally employed to insure complete solution.

The acid catalyst is preferably sulfuric acid, however, other acids such as hydrochloric acid, $BF_3$, hydrofluoric acid, polyphosphoric acid, p-toluene sulfonic acid, and nitric acid may be employed in catalytic amounts.

The reaction proceeds to completion rather quickly even at room temperature and some of the reactions are substantially complete in 5 to 15 minutes. However, some of the others may take up to and exceeding 24 hours for substantial completion and in such cases reflux temperatures may be preferred.

The amount of hydrogen sulfide which is passed through the reaction mixture is usually an amount sufficient to saturate the mixture. Preferably, an excess of hydrogen sulfide is employed to maintain saturation.

Representative of the ferrocene cyclic thioethers which may be prepared in this manner are the following:

1,1'-(dimethylenethia)ferrocene,
1,1'-(diethyl-α,α'-thia)ferrocene,
1,1'-(dipropyl-α,α'-thia)ferrocene,
1,1'-(dibenzyl-α,α'-thia)ferrocene,
1,1'-(dihexyl-α,α'-thia)ferrocene,
(1-ethyl-1'-propyl-α,α'-thia)ferrocene,
(1-ethyl-1'-benzyl-α,α'-thia)ferrocene,
1,1'-[(α,α'-dimethyl-α,α'-diphenyl)dimethylenethia]ferrocene,
1-ethyl-1'-(α-phenylpropyl)-α,α'-thiaferrocene,
1,1'-[(α,α'-tetramethyl)dimethylenethia]ferrocene, and
1-(α-cyclohexylethyl)-1'-(α'-phenylpropyl)-α,α'-thiaferrocene.

The diols intended for use as starting materials may be prepared by treating the corresponding diacyl compounds with a chemical agent such as lithium aluminum hydride, sodium borohydride, an alkyl or aryl lithium such as phenyl lithium, or alkyl magnesium halides, or with hydrogen under superatmospheric pressure at temperatures below 75° C. in the presence of a hydrogenation catalyst, such as platinum or palladium catalyst. (U.S. Patent No. 2,810,737.)

The diol in which $R_1$, $R_2$, $R_3$ and $R_4$ are hydrogen may be prepared by treating the diacyl derivative with sodium hydroxide in the presence of chlorine to form the dicarboxylic acid, and then reducing the dicarboxylic acid either in the free acid form or in the form of a lower alkyl ester with a chemical reducing agent such as lithium aluminum hydride.

Illustrative of the diols which may be prepared in the above manner are the following:

1,1'-dihydroxymethylferrocene,
1,1'-di-α-hydroxyethylferrocene,
1,1'-di-α-hydroxybutylferrocene,
1,1'-di-α-hydroxypentylferrocene,
1,1'-di-α-hydroxybenzylferrocene,
1,1'-di-α-hydroxyhexylferrocene, 1,1'-di(α-hydroxy-α-methylbenzyl)ferrocene,
1-(α-hydroxyethyl)-1'-(α'-hydroxypropyl)ferrocene,
1-(α-hydroxyethyl)-1'-(α'-hydroxybenzyl)ferrocene,
1(α-hydroxyethyl)-1'-(α'-hydroxy-α'-phenylpropyl) ferrocene,
1-(α-hydroxy-α-cyclohexylethyl)-1'-(α'-hydroxy-α'-phenylpropyl)ferrocene, and
Bis(1-hydroxyisopropyl)ferrocene.

The symmetrical diacyl derivatives, those in which $R_1$ and $R_3$, and $R_2$ and $R_4$ are the same, may be prepared by treating ferrocene with an acid chloride, or an acid anhydride and aluminum chloride in the manner described by Woodward, Rosenblum and Whiting in J. Am. Chem. Soc. 74, 3458 (1952).

The diacyl derivatives in which $R_1$ and $R_3$ are hydrogen and $R_2$ and $R_4$ are not the same, may be prepared by treating ferrocene with an aliphatic acylating agent such as a carboxylic acid anhydride, at a temperature between 20° and 120° C., in the presence of a suitable Friedel Crafts catalyst such as $BF_3$-etherate, hydrogen fluoride, a metal chloride such as aluminum chloride, or a polyphosphoric acid. (U.S. Patent No. 2,988,562.)

The monoacyl derivative thus obtained, is then treated with an acylating agent such as an acid chloride, in the presence of a Friedel Crafts catalyst, such as described above. The resulting unsymmetrical diacyl compound may be converted to the corresponding unsymmetrical diol in the manner described for the symmetrical diols.

The unsymmetrical diol may then be treated with glacial acetic acid and an acid catalyst in the presence of hydrogen sulfide, as was previously described, to form the cyclic thioether.

Ferrocene, which is used to prepare the acyl derivatives is commercially available from several sources. However, if desired, it may be prepared in the laboratory by a variety of methods. One such method involves the reaction between cyclopentadiene and iron pentacarbonyl and is described in U.S. Patent No. 2,791,597. Another such method involves the Grignard reaction between a cyclopentadienyl magnesium halide and an anhydrous halide of iron dissolved in ether, and is described in U.S. Patent No. 2,680,756. Still another method comprises treating an anhydrous halide of iron with cyclopentadienyl sodium in the manner described in U.S. Patent No. 3,092,647.

The ferrocene cyclic thioethers are effective hematinic agents, and therefore useful in the treatment of iron deficiencies in animals such as piglets, and humans. The thioethers are more rapidly absorbed when administered orally than previously prescribed hematinics and, in addition, are less toxic than ferrocene itself.

In the practice of the invention the compounds are combined with pharmaceutical diluents and formed into dosage forms suitable for oral or parenteral administration, such as tablets, capsules, syrups, elixirs, solutions or the like.

Pharmaceutical carriers which are either liquid or solid may be employed. The preferred liquid carrier is water. However, suitable organic solvents such as propylene glycol may also be employed. Flavoring materials may be included if desired.

Solid pharmaceutical carriers such as starch, sugar and talc can be utilized to form powders. Thes powders can be used as such or can be tableted or used to fill gelatin capsules. Suitable lubricants such as magnesium stearate, binders such as gelatin, and disintegrating agents such as sodium carbonate in combination with citric acid may be employed in the formation of the tablets.

Unit dosage forms, such as tablets and capsules, may contain any suitable predetermined amount of one or more of the active ingredients and may be administered one or more at a time at regular intervals. Such unit dosage forms, however, should generally contain approximately 5 to 500 mg. of the thioether.

A typical tablet may have the following composition:

| | Mg. |
|---|---|
| Ferrocene cyclic thioether | 250 |
| Polyvinylpyrrolidone (Pharmaceutical grade) | 15 |
| Corn starch | 50 |
| Magnesium stearate | 3 |

The tablets are formed on a ⅜ inch deep cup punch and the tablets may be coated if desired.

A typical soft gelatin capsule, size 0, may have the following composition:

| | | |
|---|---|---|
| Ferrocene cyclic thioether | mg | 250 |
| Polyethylene glycol 400 (q.s.ad.) | cc | 0.5 |

A typical oil solution may contain the following ingredients in each teaspoonful:

| | | |
|---|---|---|
| Ferrocene cyclic thioether | mg | 250 |
| Preservatives and flavor, q.s. | | |
| Peanut oil | ml | 5 |

A typical aqueous suspension intended for oral administration may contain the following ingredients in each teaspoonful:

| | | |
|---|---|---|
| Ferrocene cyclic thioether | mg | 250 |
| Sorbitol | cc | 1.250 |
| Sodium carboxymethyl cellulose | mg | 50 |
| Cellulose (microcrystalline) | mg | 500 |
| Preservatives and flavor, q.s. | | |
| Water (q.s.ad.) | cc | 5 |

The exact quantity of the composition to be administered, of course, will depend upon many factors including the elemental iron content of the compound and the nature and extent of the iron deficiency of the patient. However, generally speaking, the amount administered in a single day will be equivalent to about 5 mg. to about 500 mg. of elemental iron.

The following examples illustrate the preparation of the novel compounds:

Example 1.—1,1'-diacetylferrocene

To a mixture of 159 g. (1.2 moles) of aluminum chloride in 600 ml. of methylene chloride there is added in portions 96 ml. (1.35 moles) of acetyl chloride over a 15 minute period. To the resulting mixture is added in portions with stirring a solution of 90 g. (0.486 mole) of ferrocene in 500 ml. of methylene chloride over a 25 minute period. The mixture is stirred at room temperature for two hours and poured over 3 liters of crushed ice.

The reaction mixture is filtered and the aqueous layer extracted with three 500 ml. portions of chloroform. The combined organic layer is washed three times with water (800 ml.), dried over anhydrous sodium sulfate, filtered, and distilled under reduced pressure to yield a dark red residue. After one recrystallization from isopropyl alcohol, 87.9 g. (67%) of 1,1'-diacetylferrocene, M.P. 126–127°, is obtained.

Analysis.—Calcd. for $C_{14}H_{14}FeO_2$: Fe, 20.67. Found: Fe, 20.35.

Example 2.—1,1'-ferrocenedicarboxylic acid

Chlorine gas is passed through a solution of 25 g. (0.625 mole) of sodium hydroxide in 300 ml. of water in an ice-bath. After the absorption of 19 g. of chlorine gas 80 ml. of methanol is added. To the basic solution is added with stirring a solution of 7.0 g. (0.026 mole) of 1,1'-diacetylferrocene in 160 ml. of methanol at 8–15° C. over a period of 30 minutes. During the addition period, a solution of 10 g. (0.25 mole) of sodium hydroxide in 25 ml. of water is added to maintain the reaction mixture basic. The reaction mixture is then heated to 50° for 30 minutes and cooled.

After the addition of 50 ml. of methanol and cooling, the solid product is filtered, dried, and dissolved in 125 ml. of water. The water insoluble material is removed by filtration and the filtrate is made acidic with 10% HCl solution. The orange red crystalline product is filtered and recrystallized from dioxane to give 1,1'-ferrocenedicarboxylic acid, M.P. 250°.

*Analysis.*—Calcd. for $C_{12}H_{10}FeO_4$: Fe, 20.38. Found: Fe, 20.15.

Example 3.—Dimethyl 1,1'-ferrocenedicarboxylate

To solution of 700 ml. of methanol saturated with anhydrous HCl is added 3.7 g. (0.135 mole) of finely ground 1,1'-ferrocenedicarboxylic acid and the reaction mixture is allowed to reflux for 2 hours. The volume of the reaction mixture is reduced to 150 ml. under diminished pressure and poured into 1 liter of crushed ice. The resulting orange solid is filtered, dried, and dissolved in 30 ml. of benzene. The benzene insoluble material is removed by filtration and the volume of the solution is reduced to 20 ml. under diminished pressure. The orange red crystalline product is filtered and dried to give dimethyl 1,1'-ferrocenedicarboxylate, M.P. 111.5–113°.

*Analysis.*—Calcd. for $C_{14}H_{14}FeO_4$: Fe, 18.48. Found: Fe, 18.49.

Example 4.—1,1'-di-α-hydroxymethylferrocene

To a suspension of 2.66 g. (0.072 mole) of finely ground lithium aluminum hydride in 150 ml. of ether is added 2.4 g. (0.008 mole) of dimethyl 1,1'-ferrocenedicarboxylate dissolved in 200 ml. of ether over a period of 30 minutes. The reaction mixture is stirred at room temperature for 1 hour and then allowed to reflux for 8 hours.

To the reaction mixture is added dropwise 25 ml. of water and the mixture stirred for 2 hours. The reaction mixture is filtered and the filtrate drived over anhydrous sodium sulfate, and distilled in vacuo. The residue is dissolved in 100 ml. of ethanol and the alcohol insoluble fraction distilled in vacuo to yield 1,1'-di-α-hydroxymethylferrocene, orange crystalline solid, M.P. 103.5–106.5° (lit. M.P. 107–108°). After one recrystallization from ether the diol in the form of an orange crystalline solid, M.P. 106–108.5°, is obtained.

*Analysis.*—Calcd. for $C_{12}H_{14}FeO_2$: Fe, 22.68. Found: Fe, 22.47.

Example 5.—1,1'-(dimethylene-thia)ferrocene

Hydrogen sulfide is passed through a solution of 125 ml. of glacial acetic acid containing 5 drops of concentrated sulfuric acid and 10 g. (0.02 mole) of 1,1'-di-α-hydroxymethylferrocene is added in portions to the solution with stirring.

The reaction mixture is stirred at room temperature for 20 minutes and then allowed to reflux for 45 minutes. Hydrogen sulfide is passed through the solution during these periods.

The reaction mixture is cooled and poured directly over 200 g. of crushed ice. The solid product is filtered and recrystallized from methanol to give 1,1'-(dimethylene-thia)ferrocene in the form of bright yellow needles, M.P. 135–136°.

*Analysis.*—Calcd. for $C_{12}H_{12}FeS$: C, 59.02; H, 4.54; Fe, 22.87; S, 13.14; mol. wt. 244. Found: C, 59.20; H, 4.88; Fe, 22.85; S, 13.44; mol. wt. 240.

Example 6.—1,1'-(diethyl-α,α'-thia)ferrocene

Hydrogen sulfide is continuously passed through a solution of 250 ml. of glacial acetic acid containing 4 drops of conc. sulfuric acid to maintain a saturated solution and 20 g. (0.073 mole) of 1,1'-di-α-hydroxyethylferrocene is added in portions to the solution with stirring.

The reaction mixture is stirred at room temperature for 20 minutes and then allowed to reflux for 1½ hours while constantly passing hydrogen sulfide through the solution.

The reaction mixture is cooled and poured over ice (350 g.). The solid product is filtered and recrystallized from dilute methanol to give 1,1'-(diethyl-α,α'-thia)ferrocene in the form of yellow needles, M.P. 78–80°.

*Analysis.*—Calcd. for $C_{14}H_{10}FeS$: C, 61.77; H, 5.97; Fe, 20.51; S, 11.79. Found: C, 61.92; H, 5.98; Fe, 20.39; S, 11.95.

Example 7.—1,1'-dipropionylferrocene

To a dispersion of 361 g. (2.7 mole) of aluminum chloride in 1200 ml. of dichloromethane is added 283 g. (3.1 mole) of propionyl chloride over a period of 35 minutes after which a solution containing 205 g. (1.1 mole) of ferrocene dissolved in 1200 ml. of dichloromethane is added over a period of 45 minutes. The mixture is stirred at room temperature for 2 hours and poured into 8 l. of crushed ice. The organic layer is separated and the aqueous layer extracted once with 500 ml. of dichloromethane. The combined organic solution is washed once with 2 liters of water, dried over anhydrous sodium sulfate and concentrated in vacuo to yield a red oil which is crystallized and recrystallized from ethyl ether (using a Dry Ice/acetone bath as a cooling medium) to yield 1,1'-dipropionylferrocene, M.P. 52–54.5°.

*Analysis.*—Calcd. for $C_{16}H_{18}FeO_2$: C, 64.43; H, 6.08; Fe, 18.74. Found: C, 64.04; H, 6.25; Fe, 18.79.

Example 8.—1,1'-di-α-hydroxypropylferrocene

To a dispersion of 8 g. (0.21 mole) of sodium borohydride in 300 ml. of isopropanol is added 29.8 g. (0.1 mole) of 1,1'-dipropionylferrocene in one portion after which the mixture is gently refluxed for 6 hours. It is then cooled, dissolved in 700 ml. of ether and washed with 300 ml. of water and 300 ml. of brine, dried over anhydrous sodium sulfate and reduced in vacuo to yield a yellow orange oil which was fractionated to yield 1,1'-di-α-hydroxypropylferrocene, B.P. 150–155°/0.05 mm.

*Analysis.*—Calcd. for $C_{16}H_{22}FeO$: C, 63.59; H, 7.34; Fe, 18.48. Found: C, 63.89; H, 7.37; Fe, 18.88.

Example 9.—1,1'-(dipropyl-α,α'-thia)ferrocene

To a solution of 150 ml. of glacial acetic acid containing four drops of concentrated sulfuric acid, 1,1'-di-α-hydroxypropylferrocene is added in portions with constant stirring.

The reaction mixture is stirred at room temperature for 20 minutes and then allowed to reflux for 50 minutes while passing hydrogen sulfide through the solution during these periods.

The reaction mixture is cooled and poured over 500 g. of ice and the resulting bright yellow solid is filtered and recrystallized from dilute methanol to give 1,1'-(dipropyl-α,α'-thia)ferrocene, M.P. 67–72°.

*Analysis.*—Calcd. for $C_{16}H_{20}FeS$: Fe, 18.60; S. 10.68. Found: Fe, 18.49; S, 10.85.

Example 10.—1,1'-dibenzoylferrocene

To a mixture of 361 g. (2.7 mole) of aluminum chloride in 1200 ml. of dichloromethane is added 432 g. (3.1 mole) of benzoyl chloride over a period of 40 minutes after which a solution containing 205 g. (1.1 mole) of ferrocene dissolved in 1200 ml. of dichloromethane is added over a period of 80 minutes. The mixture is stirred at room temperature for 2 hours and poured onto 8 liters of crushed ice. The aqueous layer is separated and washed twice with 300 ml. portion of dichloromethane. The combined organic solution is washed twice with 1 liter portions of 10% sodium hydroxide solution, once with 1 liter of water, dried over sodium sulfate, and concentrated in vacuo to yield a red syrup which is crystallized from ethanol to yield 1,1'-dibenzoylferrocene in the form of a dark red crystalline solid, M.P. 100–103°.

*Analysis.*—Calcd. for $C_{24}H_{18}FeO_2$: Fe, 14.17. Found: Fe, 13.97.

Example 11.—1,1'-di-α-hydroxybenzylferrocene

To a mixture of 7.6 g. (0.2 mole) of sodium borohydride in 500 ml. of isopropanol there is added in portions 30 g. (0.077 mole) of 1,1'-dibenzoylferrocene with cooling and stirring. The reaction mixture is stirred at room temperature for two hours and then allowed to reflux for five hours.

The reaction mixture is cooled and distilled under diminished pressure to remove the solvent and the residue is dissolved in 750 ml. of water. The solid product is filtered and recrystallized from dilute isopropanol to give 1,1'-di-α-hydroxybenzylferrocene, M.P. 132°, light brown plates.

*Analysis.*—Calcd. for $C_{24}H_{22}FeO_2$: Fe, 14.02. Found: Fe, 13.95.

Example 12.—1,1'-(dibenzyl-α,α'-thia)ferrocene

Hydrogen sulfide is passed through a solution of 150 ml. of glacial acetic acid containing three drops of concentrated sulfuric acid for 25 minutes and 5.0 g. (0.0126 mole) of 1,1'-di-α-hydroxybenzylferrocene is added in portions with stirring.

The reaction mixture is stirred at room temperature for 60 minutes while passing hydrogen sulfide through the solution during this period. The bright yellow solid product is precipitated from the solution. The mixture is poured over 1 liter of ice water and the solid product is filtered and recrystallized from isopropyl alcohol to give 1,1'-(dibenzyl-α,α'-thia)ferrocene, M.P. 148–149°.

*Analysis.*—Calcd. for $C_{24}H_{20}FeS$: Fe, 14.09; S, 8.10. Found: Fe, 13.83; S, 8.40.

Example 13.—1,1'-dihexanoylferrocene

To a mixture of 164 g. (1.24 mole) of aluminum chloride in 550 ml. of dichloromethane is added 187 g. (1.39 mole) of hexanoyl chloride in portions over a 15 minute period, then a filtered solution of 93 g. (0.5 mole) of ferrocene in 600 ml. of dichloromethane is added in portions over a 40 minute period. The mixture is stirred at room temperature for 2 hours and poured onto 3 liters of crushed ice. The aqueous layer is separated and extracted once with 300 ml. of dichloromethane. The combined organic solution is washed once with 1 liter of water, once with 1 liter of 10% sodium hydroxide, and once with 500 ml. of brine after which it is dried and concentrated. The dark red oily residue is crystallized from n-hexane to yield 1,1'-dihexanoylferrocene in the form of rust red needles, M.P. 43–45°.

*Analysis.*—Calcd. $C_{22}H_{30}FeO_2$: C, 69.13; H, 7.90; Fe, 14.61. Found: C, 69.16; H, 7.95; Fe, 14.57.

Example 14.—1,1'-di-α-hydroxyhexylferrocene

To a mixture of 8 g. (0.21 mole) of sodium borohydride in 500 ml. of isopropanol is added 38.2 g. (0.1 mole) of 1,1'-dihexanoylferrocene in one portion after which the mixture is gently refluxed for 6 hours. It is then cooled and dissolved in a mixture of 600 ml. of water and 500 ml. of ether. The aqueous layer is separated and extracted once with 100 ml. of ether. The combined organic solution is washed with 300 ml. of brine, dried, and concentrated in vacuo to yield a yellow oil which is crystallized from aqueous isopropanol to yield a yellow light textured solid, M.P. 45–49°. A 5.0 g. sample is recrystallized again from aqueous isopropanol to yield 1,1'-di-α-hydroxyhexylferrocene, M.P. 58.5–60°.

*Analysis.*—Calcd. for $C_{22}H_{34}FeO_2$: C, 68.46; H, 8.87; Fe, 14.45. Found: C, 68.39; H, 9.07; Fe, 14.45.

Example 15.—1,1'-(dihexyl-α,α'-thia)ferrocene

The procedure of Example 12 is repeated using 1,1'-di-α-hydroxyhexylferrocene as the diol. The compound 1,1'-(dihexyl-α,α'-thia)ferrocene is obtained, B.P. 170°/0.05 mm.

Example 16.—1-acetyl-1'-propionylferrocene

To a dispersion of 20.3 g. (0.15 mole) of aluminum chloride in 200 ml. of dischloromethane is added dropwise a solution of 13.9 g. (0.06 mole) 1-acetylferrocene in 125 ml. of dischloromethane. The mixture is heated to reflux and 6.1 g. (0.07 mole) of propionyl chloride in 100 ml. of dichloromethane is added in 25 minutes after which it is refluxed for an additional 35 minutes. The mixture is poured into 1 liter of ice water and extracted with chloroform. The extract is washed with 10% sodium hydroxide solution, brine, and concentrated to yield a dark oil which is chromatographed through activated alumina using ether as an eluant to yield a semi-solid which is crystallized. It is recrystallized from ether and cooled in a Dry Ice/acetone bath to yield an orange solid, 1-acetyl-1'-propionylferrocene, M.P. 58.5–59°.

*Analysis.*—Calcd. for $C_{15}H_{16}FeO_2$: C, 63.41; H, 5.68. Found: C, 63.42; H, 5.53.

Example 17.—1-(α-hydroxyethyl)-1'-(α'-hydroxypropyl)ferrocene

A mixture of 13.8 g. (0.049 mole) of 1-acetyl-1'-propionyl- ferrocene and 4.0 g. (0.16 mole) of sodium borohydride in 225 ml. of isopropanol is refluxed for 4.5 hours. The mixture is concentrated and 50 ml. of brine and 150 ml. of ether are added. The mixture is then stirred for 10 minutes. The ether solution is separated, washed with brine, dried, and concentrated. The residue is taken up in 150 ml. of benzene, treated with activated charcoal, and concentrated to yield a yellow oil which is dried at 70°/4.0 mm. to yield 1-(α-hydroxyethyl)-1'-(α'-hydroxypropyl)ferrocene, B.P. 140°/0.05 mm.

*Analysis.*—Calcd. for $C_{15}H_{20}FeO_2$: C, 62.51; H, 7.00; Fe, 19.39. Found: C, 62.69; H, 7.25; Fe, 19.35.

Example 18.—(1-ethyl-1'-propyl-α,α'-thia)ferrocene

The procedure of Example 12 is repeated using 1-(α-hydroxyethyl)-1'-(α'-hydroxypropyl)ferrocene as the diol. The compound, (1-ethyl-1'-propyl-α,α'-thia)ferrocene, is obtained, M.P. 79–80° C.

Example 19.—1-acetyl-1'-benzoylferrocene

To a dispersion of 21.6 g. (0.162 mole) of aluminum chloride in 200 ml. of dichloromethane is added 9.8 g. (0.07 mole) of benzoyl chloride, dissolved in 30 ml. dichloromethane in 15 minutes. A solution of 14.8 g. (0.065 mole) of 1-acetylferrocene in 150 ml. dichloromethane is then added in portions over a 20 minute period after which the mixture is stirred for 2 hours at room temperature and then poured into 1 liter of ice water. The organic layer is separated, and the aqueous layer extracted twice with chloroform. The organic solutions are combined and washed twice with 200 ml. portions of 10% sodium hydroxide, once with brine, dried, and concentrated to yield a red oil. It is chromatographed through activated alumina. n-Hexane (2.5 liters) is passed through the column to yield a yellow solid which is recrystallized from n-hexane to yield 2.3 g. of 1-acetylferrocene. A 50% solution of n-hexane and ether (800 ml.) is then passed through the column to yield a red oil which is crystallized from 100 ml. of ether, cooled in a salted ice bath to give 1-acetyl-1'-benzoyl-ferrocene in the form of a bright red powder, M.P. 69–70°.

*Analysis.*—Calcd. for $C_{19}H_{16}FeO$: C, 68.71; H, 4.85. Found, C, 68.85; H. 5.01.

Example 20.—1-(α-hydroxyethyl)-1'-(α'-hydroxybenzyl)ferrocene

A mixture of 4.4 g. (0.013 mole) of 1-acetyl-1'-benzoylferrocene and 1.06 g. (0.028 mole) of sodium borohydride in 65 ml. of isopropanol is gently refluxed for 4.5 hours after which it is concentrated in vacuo to yield a yellow residue which is stirred in a mixture of 100 ml. of ether and 50 ml. of brine for 0.5 hour. The aqueous layer is separated and extracted twice with ether. The organic solutions are combined, washed with brine, dried, and concentrated to yield a solid which is recrystallized from ethanol to yield 1-(α-hydroxyethyl)-1'-(α'-hydroxybenzyl)ferrocene in the form of a yellow crystalline powder, M.P. 122–123.5°.

*Analysis.*—Calcd. for $C_{19}H_{20}FeO_2$: C, 67.87; H, 6.00. Found: C, 67.89; H, 6.20.

Example 21.—(1-ethyl-1'-benzyl-α,α'-thia)ferrocene

The procedure of Example 13 is repeated using 1-(α-hydroxyethyl)-1'-(α'-hydroxybenzyl)ferrocene as the diol. The compound 1-ethyl-1'-benzyl-α,α'-thia)ferrocene is obtained, M.P. 105°–125° C.

Example 22.—Bis(1-hydroxyisopropyl)ferrocene

To a Grignard reagent prepared from 3.7 g. (0.15 mole) of magnesium and 42.4 g. (0.30 mole) of methyl iodide in 250 ml. of ether is added a solution of 10 g. (0.037 mole) of 1,1'-diacetylferrocene in 200 ml. of benzene in 45 minutes. The mixture is refluxed for 1¾ hours and stirred at room temperature for 16 hours. The complex is decomposed by the addition of 50 ml. of saturated ammonium chloride. The organic layer is separated, washed with 50 ml. of brine, dried and concentrated to yield an oil which is chromatographed through silica gel (190 g., 3 x 52 cm.) using 1.6 liters of a solution of varying proportions of ether and n-hexane to yield 4.6 g. of a crude material which is rechromatographed through silica gel (80 g., 3 x 25 cm.) in the same manner to yield bis(1-hydroxyisopropyl)ferrocene as a yellow-orange semisolid.

Example 23.—1,1'-[(α,α'-tetramethyl)dimethylenethia]ferrocene

To a solution of 1 drop of sulfuric acid in 35 ml. of glacial acetic acid saturated with hydrogen sulfide is added a solution of 1.5 g. (0.005 mole) of bis(1-hydroxyisopropyl) ferrocene in 15 ml. of benzene. While bubbling hydrogen sulfide through the solution, it is stirred at room temperature ½ hour and at 80° for 1 hour. The solution is concentrated in vacuo and the residue is dissolved in 50 ml. of benzene, washed with 25 ml. of brine, dried and concentrated to yield a solid which is chromatographed through silica gel (40 g., 2 x 34 cm.) using 600 ml. of varying proportions of benzene and n-hexane to yield a yellow solid which is recrystallized from n-hexane to yield 1,1' - [(α,α'-tetramethyl)-dimethylenethia]ferrocene in the form of a yellow needle solid, M.P. 142–143°.

*Analysis.*—Calcd. for $C_{16}H_{20}FeS$: C, 64.01; H, 6.71. Found: C, 64.00; H, 7.06.

Example 24.—1,1'-di(α-hydroxy-α-methylbenzyl)ferrocene

To a solution of 60 ml. (0.12 mole) of phenyllithium in benzene-ether is added dropwise under nitrogen 10 g. (0.037 mole) of diacetylferrocene in 450 ml. of benzene. The reaction mixture is stirred at room temperature for 3 hours and then allowed to reflux for 30 minutes under nitrogen.

After cooling, 15 ml. of saturated ammonium chloride solution is added dropwise to the mixture and it is stirred for 15 minutes. The solvent is distilled under diminished pressure to yield 16 g. of a dark semisolid.

The dark residue is dissolved in 200 ml. of n-hexane benzene (3:1) and the solution cooled using Dry Ice bath to give the crude diol, M.P. 124–126°, yellow solids.

The filtrate is distilled under diminished pressure and the residue triturated using ethanol to give 1,1'-di(α-hydroxy-α-methylbenzyl)ferrocene, M.P. 140–142°, yellow plates.

*Analysis.*—Calcd. for $C_{26}H_{26}FeO_2$: Fe, 13.20. Found: Fe, 13.30.

Example 25.—1,1-[(α,α'-dimethyl-α,α'-diphenyl)dimethylenethia]ferrocene

The procedure of Example 23 is repeated using 1,1'-di(α-hydroxy-α-methylbenzylferrocene as the diol. The compound 1,1' - [(α,α'-dimethyl-α,α'-diphenyl)dimethylenethia]ferrocene is obtained.

It will be readily apparent to those skilled in the art that the ferrocene cyclic thioethers may exist in different stereochemical forms.

I claim:
1. A compound of the formula

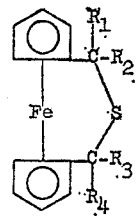

wherein $R_1$, $R_2$, $R_3$ and $R_4$ are selected from hydrogen, alkyl, aryl, aralkyl, cycloalkyl and cycloalkyl-loweralkyl.

2. 1,1'-(dialkyl-α,α'-thia)ferrocene.
3. 1,1'-(dimethylene-thia)ferrocene.
4. 1,1'-(diethyl-α,α'-thia)ferrocene.
5. 1,1'-(dipropyl-α,α'-thia)ferrocene.
6. 1,1'-(dipropyl-α,α'-thia)ferrocene.
7. 1,1'-(dihexyl-α,α'-thia)ferrocene.
8. (1-ethyl-1'-propyl-α,α'-thia)ferrocene.
9. (1-ethyl-1'-benzyl-α,α'-thia)ferrocene.
10. 1-ethyl-1'-(α-phenylpropyl)-α,α'-thiaferrocene.
11. 1 - (α-cyclohexylethyl)-1'-(α'-phenylpropyl)-α,α'-thiaferrocene.
12. 1,1' - [(α,α' - dimethyl-α,α'-diphenyl)dimethylenethia]ferrocene.
13. 1,1'-[(α,α'-tetramethyl)dimethylenethia]ferrocene.
14. The process which comprises treating a compound of the formula

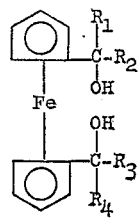

with hydrogen sulfide in the presence of a concentrated liquid lower aliphatic acid selected from the group consisting of acetic, propionic and formic acid and an acid catalyst to form a cyclic thioether of the formula

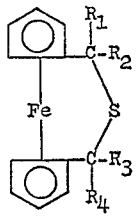

wherein $R_1$, $R_2$, $R_3$ and $R_4$ are selected from the group consisting of hydrogen, alkyl, aryl, aralkyl, cycloalkyl and cycloalkyl-loweralkyl.

15. The process of claim 14 in which the lower aliphatic acid is glacial acetic acid.

16. The process of preparing a 1,1'-(dialkyl-α,α'-thia)-ferrocene which comprises treating a 1,1'-di-α-hydroxyalkylferrocene with hydrogen sulfide in the presence of lower aliphatic acid containing an acid catalyst.

References Cited

Winslow et al., J. Org. Chem., 26 (1961), p. 2982.

TOBIAS E. LEVOW, *Primary Examiner.*

A. P. DEMERS, *Assistant Examiner.*